US012683241B2

(12) United States Patent
Kim et al.

(10) Patent No.: US 12,683,241 B2
(45) Date of Patent: Jul. 14, 2026

(54) BATTERY MODULE AND BATTERY PACK COMPRISING SAME

(71) Applicant: LG ENERGY SOLUTION, LTD., Seoul (KR)

(72) Inventors: Seung-Hyun Kim, Daejeon (KR); Yu-Dam Kong, Daejeon (KR); Jin-Kyu Shin, Daejeon (KR); Young-Hoo Oh, Daejeon (KR); Seung-Min Ok, Daejeon (KR); Sang-Hyun Jo, Daejeon (KR); Sung-Goen Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 523 days.

(21) Appl. No.: 18/270,631

(22) PCT Filed: Jan. 11, 2022

(86) PCT No.: PCT/KR2022/000498
§ 371 (c)(1),
(2) Date: Jun. 30, 2023

(87) PCT Pub. No.: WO2022/149962
PCT Pub. Date: Jul. 14, 2022

(65) Prior Publication Data
US 2024/0072374 A1 Feb. 29, 2024

(30) Foreign Application Priority Data
Jan. 11, 2021 (KR) ........................ 10-2021-0003554

(51) Int. Cl.
*H01M 50/383* (2021.01)
*H01M 50/211* (2021.01)
(Continued)

(52) U.S. Cl.
CPC ....... *H01M 50/383* (2021.01); *H01M 50/211* (2021.01); *H01M 50/224* (2021.01); *H01M 50/507* (2021.01); *H01M 2220/20* (2013.01)

(58) Field of Classification Search
CPC .......................... H01M 50/383; H01M 50/507
See application file for complete search history.

(56) References Cited

U.S. PATENT DOCUMENTS

2006/0216579 A1 9/2006 Cho
2008/0220320 A1 9/2008 Horikoshi et al.
(Continued)

FOREIGN PATENT DOCUMENTS

CN 205632089 U 10/2016
CN 109478630 A 3/2019
(Continued)

OTHER PUBLICATIONS

Extended European Search Report for European Application No. 22736939.4, dated Aug. 23, 2024.
(Continued)

*Primary Examiner* — Sarah A. Slifka
(74) *Attorney, Agent, or Firm* — Birch, Stewart, Kolasch & Birch, LLP

(57) ABSTRACT

A battery module includes a cell stack in which a plurality of battery cells are vertically stacked; a module housing including a base plate supporting the cell stack and a pair of side plates covering both side portions of the cell stack; a bus bar frame assembly covering an opening portion formed on a side of the module housing in a longitudinal direction of the module housing; and a plurality of spark delay portions protruding from an inner surface of each of the pair of side plates and spaced apart from one another in a height direction of the side plate.

19 Claims, 10 Drawing Sheets

(51) Int. Cl.
H01M 50/224 (2021.01)
H01M 50/507 (2021.01)

(56) References Cited

U.S. PATENT DOCUMENTS

| | | | |
|---|---|---|---|
| 2015/0280189 | A1 | 10/2015 | Ohshiba et al. |
| 2018/0108892 | A1 | 4/2018 | Kim et al. |
| 2019/0198952 | A1 | 6/2019 | Choi et al. |
| 2019/0221814 | A1 | 7/2019 | Shimizu |
| 2020/0014005 | A1 | 1/2020 | Lee et al. |
| 2021/0066690 | A1 | 3/2021 | Gondoh |
| 2021/0226295 | A1 | 7/2021 | Kwon et al. |
| 2021/0313650 | A1 | 10/2021 | Gondoh |
| 2021/0320374 | A1 | 10/2021 | Lee et al. |
| 2022/0102813 | A1 | 3/2022 | Cho et al. |
| 2022/0115737 | A1 | 4/2022 | Shin et al. |
| 2022/0149468 | A1 | 5/2022 | Sakamoto et al. |

FOREIGN PATENT DOCUMENTS

| | | | |
|---|---|---|---|
| CN | 109713178 | A | 5/2019 |
| CN | 211670261 | U | 10/2020 |
| CN | 112201890 | A | 1/2021 |
| EP | 3 671 890 | A1 | 6/2020 |
| JP | 2008-218210 | A | 9/2008 |
| JP | 2014-192365 | A | 10/2014 |
| JP | 2015-118811 | A | 6/2015 |
| JP | 2018-174147 | A | 11/2018 |
| JP | 2022-517607 | A | 3/2022 |
| JP | 7355765 | B2 | 10/2023 |
| KR | 10-2006-0102852 | A | 9/2006 |
| KR | 10-2016-0078035 | A | 7/2016 |
| KR | 10-2016-0123852 | A | 10/2016 |
| KR | 10-2018-0099438 | A | 9/2018 |
| KR | 10-2019-0122474 | A | 10/2019 |
| KR | 10-2030726 | B1 | 10/2019 |
| KR | 10-2042577 | B1 | 11/2019 |
| KR | 10-2020-0107213 | A | 9/2020 |
| KR | 10-2181521 | B1 | 11/2020 |
| WO | WO 2019/071184 | A1 | 4/2019 |
| WO | WO 2019/176415 | A1 | 9/2019 |
| WO | WO 2020/039722 | A1 | 2/2020 |
| WO | WO 2021/002626 | A1 | 1/2021 |

OTHER PUBLICATIONS

International Search Report (PCT/ISA/210) issued in PCT/KR2022/000498, dated Apr. 19, 2022.

BATTERY MODULE AND BATTERY PACK COMPRISING SAME

TECHNICAL FIELD

The present disclosure relates to a battery module, a battery pack including the same, and an energy storage system (ESS) and a vehicle including the battery pack. More particularly, the present disclosure relates to a battery module having a structure capable of, when venting of a battery cell occurs, discharging gas to the outside, preventing a spark containing high-temperature electrode active material and metal particles from leaking to the outside of the battery module, and preventing oxygen from being introduced into the battery module to prevent a fire in the battery module, a battery pack including the battery module, and an energy storage system (ESS) and a vehicle including the battery pack.

The present application claims priority to Korean Patent Application No. 10-2021-0003554 filed on Jan. 11, 2021 in the Republic of Korea, the disclosures of which are incorporated herein by reference.

BACKGROUND ART

A battery pack applied to an energy storage system (ESS) and/or an electric vehicle may be manufactured to include a plurality of battery modules to which high-power and high-capacity lithium secondary batteries are applied. In order to satisfy the output power characteristics of a battery pack required by an ESS and/or an electric vehicle and realize high capacity, the number of lithium secondary batteries included in one battery module may be increased, and the number of battery modules included in one battery pack may be increased.

However, when a fire or explosion occurs in a battery pack including such a large number of lithium secondary batteries, damage is inevitably increased.

A fire occurring in a battery pack starts from an abnormal temperature rise and internal gas generation of a lithium secondary battery in a battery module. When a temperature of a lithium secondary battery abnormally rises and internal gas is generated, and thus internal pressure of the lithium secondary battery increases to a certain level or higher, venting of the lithium secondary battery occurs, and thus, high-temperature gas is ejected to the outside of the lithium secondary battery, and a high-temperature spark containing electrode active material and aluminum particles is ejected.

In order to ensure the safety in use of a battery module and/or a battery pack, venting gas should be able to be rapidly discharged to the outside of the battery module so that internal pressure of the battery module is no longer increased when an event occurs. However, when a high-temperature spark is discharged along with the venting gas to the outside of the battery module, the venting gas, the high-temperature spark, and oxygen may meet to cause a fire.

Accordingly, there is a demand to develop a battery module having a structure capable of, even when thermal runaway occurs due to abnormality such as a short circuit in a battery cell, rapidly discharging venting gas to the outside of the battery module and effectively preventing a high-temperature spark containing electrode active material and aluminum particles from leaking to the outside.

Also, when a structure such as a bus bar frame applied to prevent a short circuit between a plurality of lithium secondary batteries is damaged due to continuous contact with high-temperature gas and sparks, oxygen may be easily introduced from the outside of a battery module into the battery module, and a fire may even spread into the battery module. Also, when the bus bar frame is damaged, electrode leads of adjacent lithium secondary batteries which are kept apart from each other due to the bus bar frame may contact each other, and an event may spread.

Accordingly, there is a demand to develop a battery module having a structure capable of, even when some structures are damaged due to high-temperature gas and sparks, preventing a free inflow of external oxygen and preventing an event from spreading due to a short circuit between adjacent lithium secondary batteries.

DISCLOSURE

Technical Problem

The present disclosure is designed to solve the problems of the related art, and therefore the present disclosure is directed to providing a battery module having a structure capable of, when an internal event occurs, rapidly discharging venting gas, effectively preventing a high-temperature spark from leaking to the outside, and after the venting gas is discharged, preventing external air from being introduced into the battery module.

The present disclosure is also directed to providing a battery module having a structure capable of, even when some structures are damaged due to high-temperature gas and sparks, preventing external oxygen from being easily introduced into the battery module and preventing a short circuit between adjacent lithium secondary batteries.

However, the technical purpose to be solved by the present disclosure is not limited to the above, and other objects not mentioned herein will be clearly understood by one of ordinary skill in the art from the following disclosure.

Technical Solution

A battery module according to an embodiment of the present disclosure includes: a cell stack in which a plurality of battery cells are vertically stacked; a module housing including a base plate supporting the cell stack and a pair of side plates covering side portions of the cell stack; a bus bar frame assembly covering an opening portion formed on an end of the module housing in a longitudinal direction of the module housing; and a plurality of spark delay portions protruding from an inner surface of each of the pair of side plates and spaced apart from one another in a height direction of each side plate.

Each side plate of the pair of side plates may include a spark direction changing portion formed by bending an end portion of each side plate in a longitudinal direction of each side plate toward the cell stack.

The opening portion may be formed between a pair of the spark direction changing portions respectively provided on the pair of side plates, wherein electrode leads of the plurality of battery cells are exposed to outside of the module housing through the opening portion.

The bus bar frame assembly may include: a bus bar frame covering the opening portion, and including a plurality of frame slits through which electrode leads of the plurality of battery cells pass; and at least one bus bar located on an outer surface of the bus bar frame and coupled to the electrode leads passing through the frame slit.

The battery module may further include a fire-proof sheet assembly located between the bus bar frame assembly and the cell stack, and coupled to the bus bar frame assembly.

The fire-proof sheet assembly may include a fire-proof sheet including a plurality of sheet slits through which electrode leads of the plurality of battery cells pass.

The fire-proof sheet assembly may further include a sheet cover including a plurality of cover slits through which the electrode leads of the plurality of battery cells pass, the sheet cover covering the fire-proof sheet.

The fire-proof sheet may be a mica sheet.

The sheet cover may completely cover the fire-proof sheet so that the fire-proof sheet is not exposed to external air.

A width of each of the plurality of cover slits may decreases toward the bus bar frame assembly.

The module housing may be formed of a metal material, and the plurality of spark delay portions may be formed of a resin material.

The plurality of spark delay portions may include a first delay plate and a second delay plate inclined upward or inclined downward with respect to the base plate in a direction facing each other.

The first delay plate and the second delay plate may be spaced apart from each other.

An energy storage system (ESS) according to an embodiment of the present disclosure includes the battery pack according to an embodiment of the present disclosure.

A vehicle according to an embodiment of the present disclosure includes the battery pack according to an embodiment of the present disclosure.

Advantageous Effects

According to an aspect of the present disclosure, even when some structures are damaged due to high-temperature gas and sparks caused by an event, venting gas may be rapidly discharged, a high-temperature spark may be effectively prevented from leaking to the outside, and after the venting gas is discharged, external air may be prevented from being introduced into a battery module.

According to another aspect of the present disclosure, even when some structures are damaged due to high-temperature gas and sparks, external oxygen may be prevented from being easily introduced into a battery module and a short circuit between adjacent lithium secondary batteries may be prevented.

The plurality of spark delay portions may be aligned in the height direction of each side plate.

Each of the plurality of spark delay portions may be V-shaped.

The plurality of spark delay portions may include a first set of spark delay portions and a second set of spark delay portions spaced from the first set in a longitudinal direction of each side plate.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
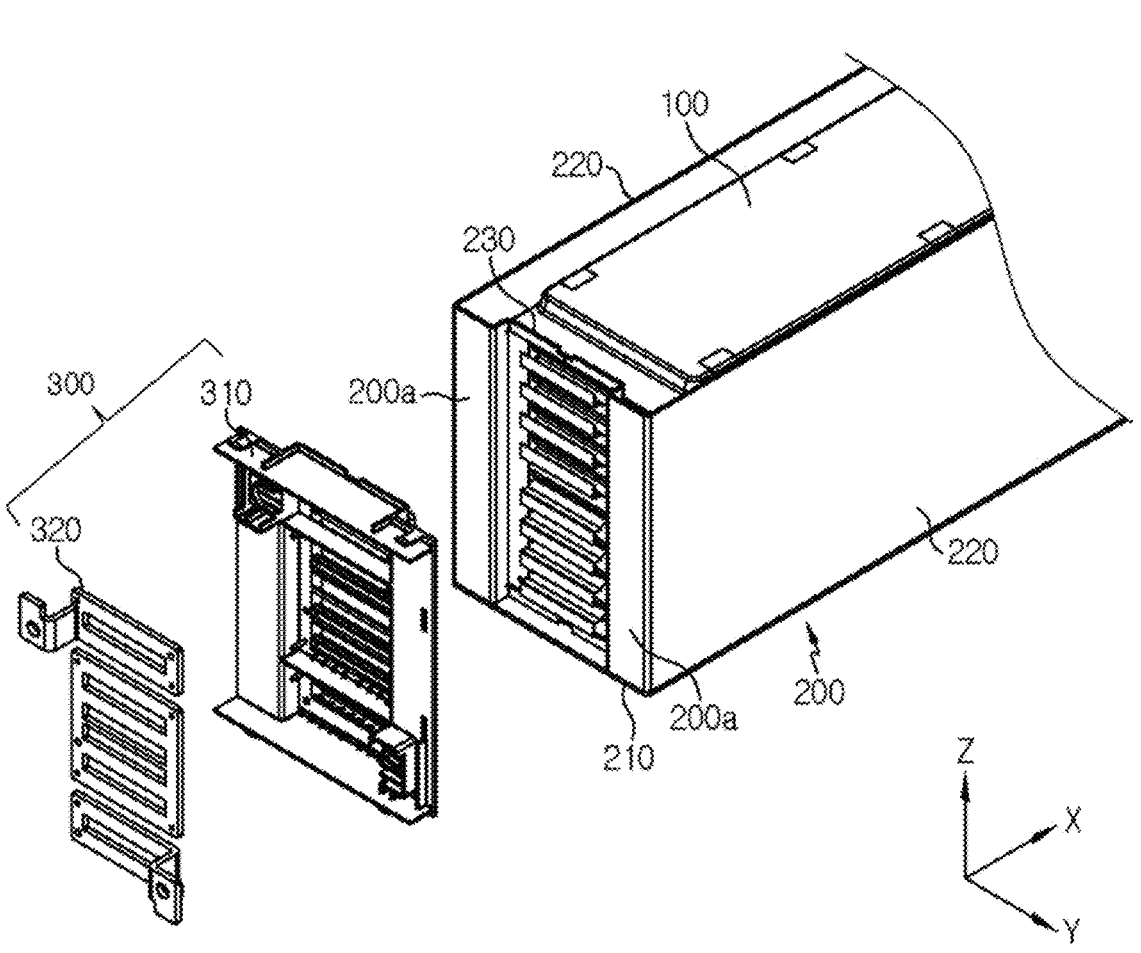
FIG. 1 is a view illustrating a battery module according to an embodiment of the present disclosure.
Figure 2:
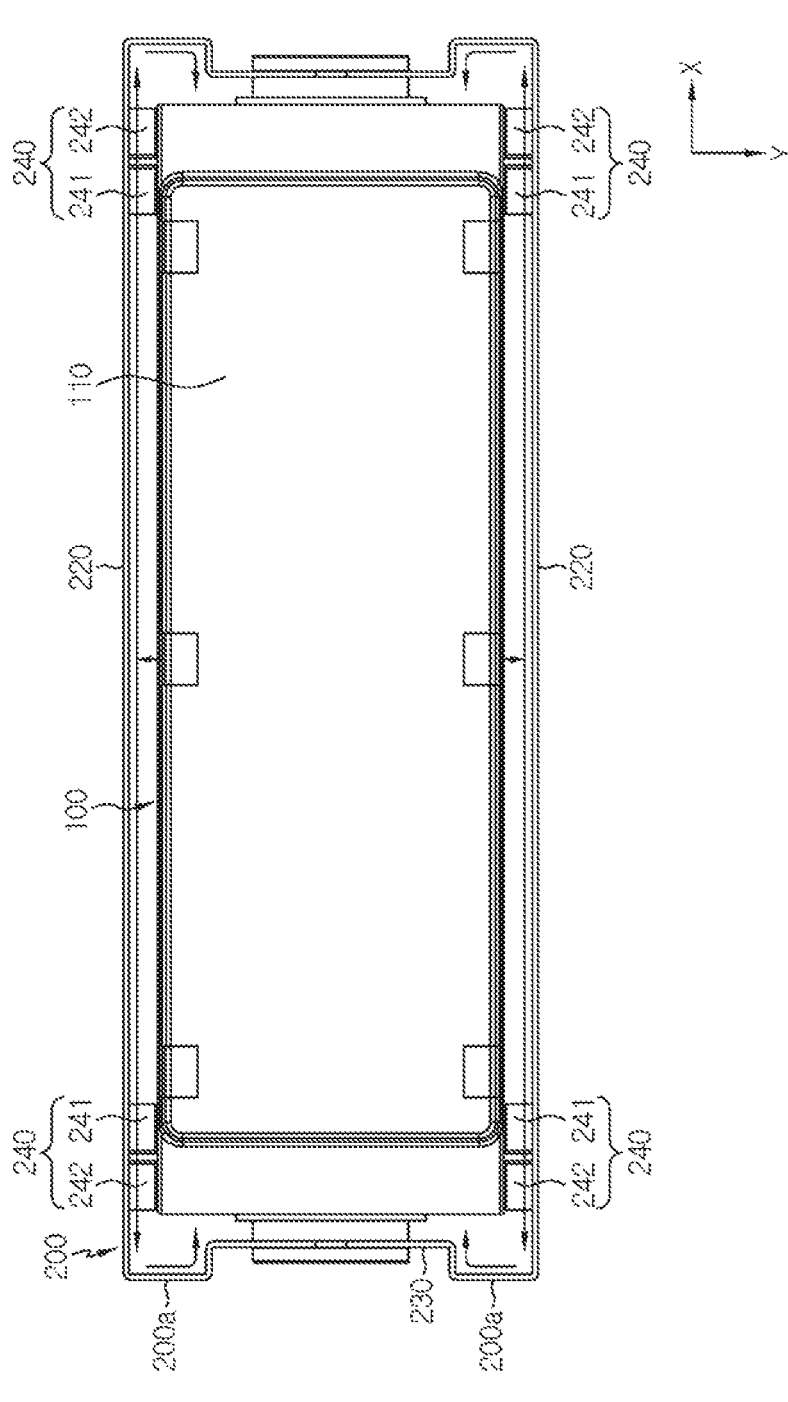
FIG. 2 is a plan view illustrating a state where a bus bar frame assembly and a fire-proof sheet assembly are removed from the battery module of FIG. 1.
Figure 3:
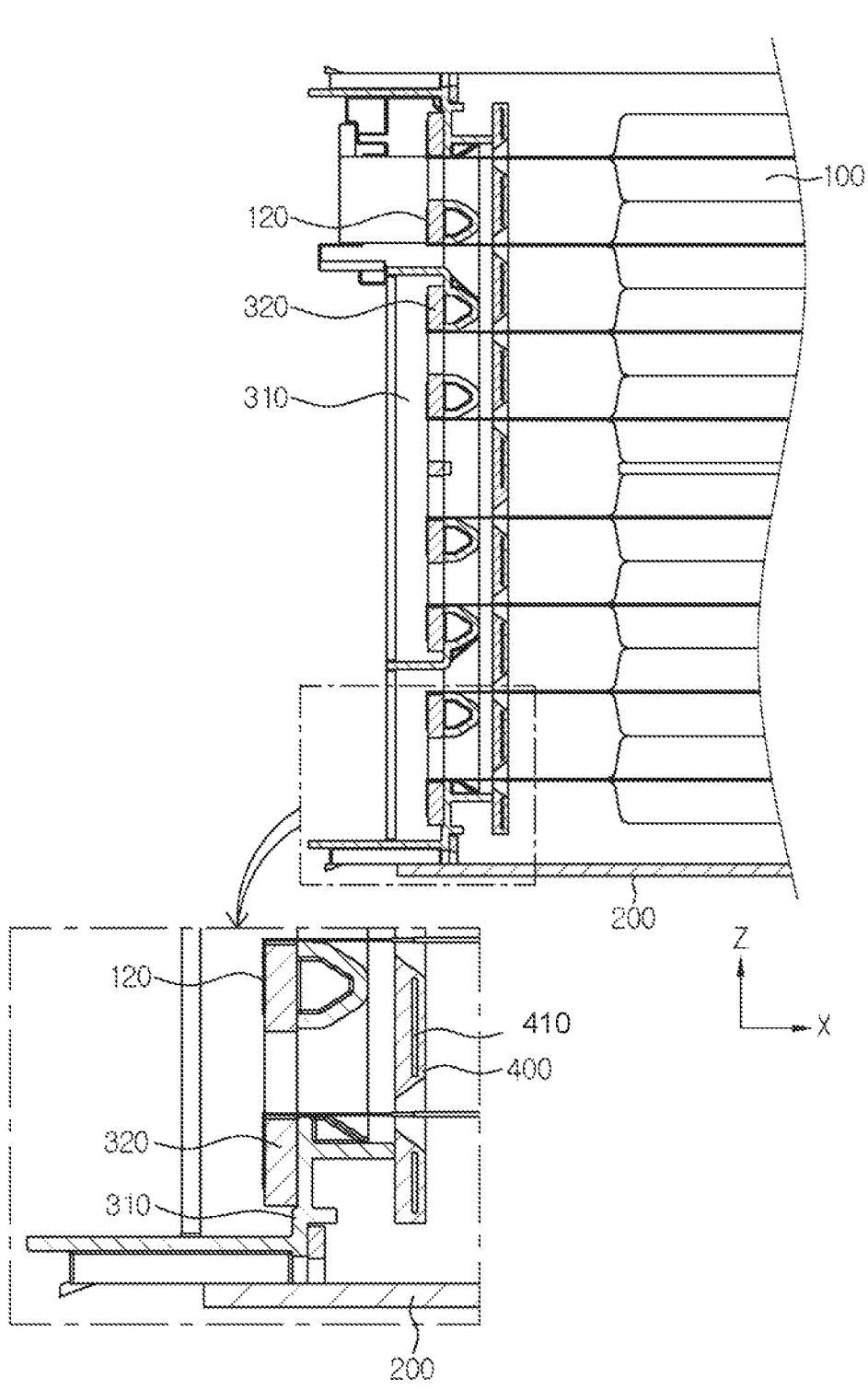
FIG. 3 is a partial cross-sectional view illustrating the battery module of FIG. 1.
Figure 4:
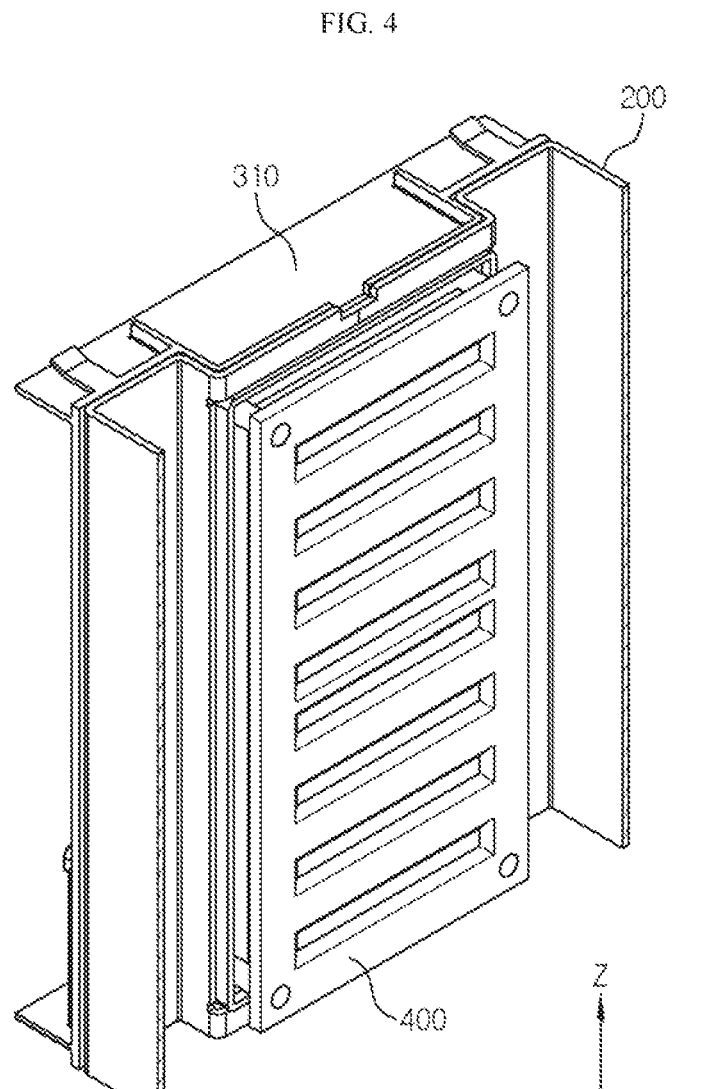
FIG. 4 is a view illustrating a state where a bus bar frame assembly and a fire-proof sheet assembly are coupled to a module housing according to the present disclosure.
Figure 5:
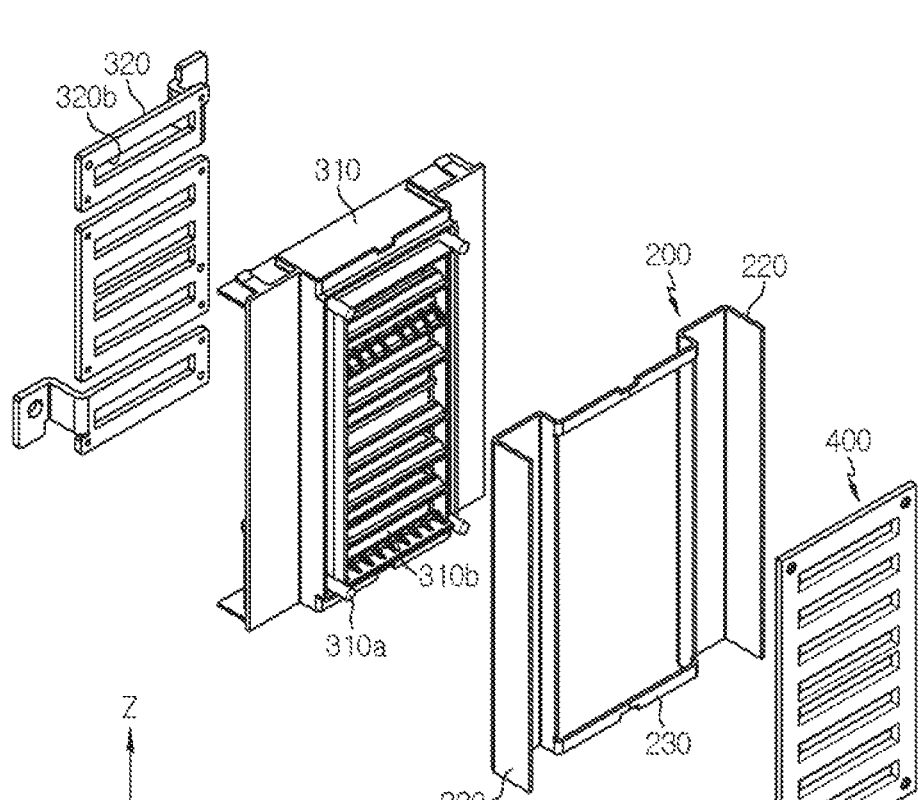
FIG. 5 is an exploded perspective view illustrating a part of a module housing, a bus bar frame assembly, and a fire-proof sheet assembly according to the present disclosure.
Figure 6:
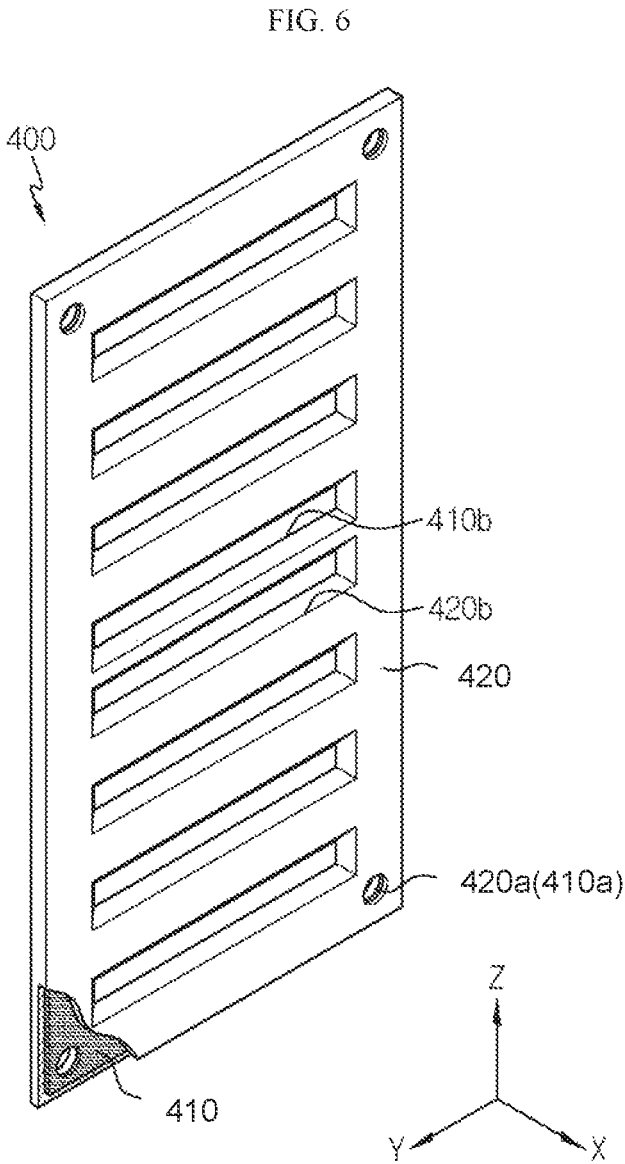
FIG. 6 is a view illustrating a fire-proof sheet assembly according to the present disclosure.
Figure 7:
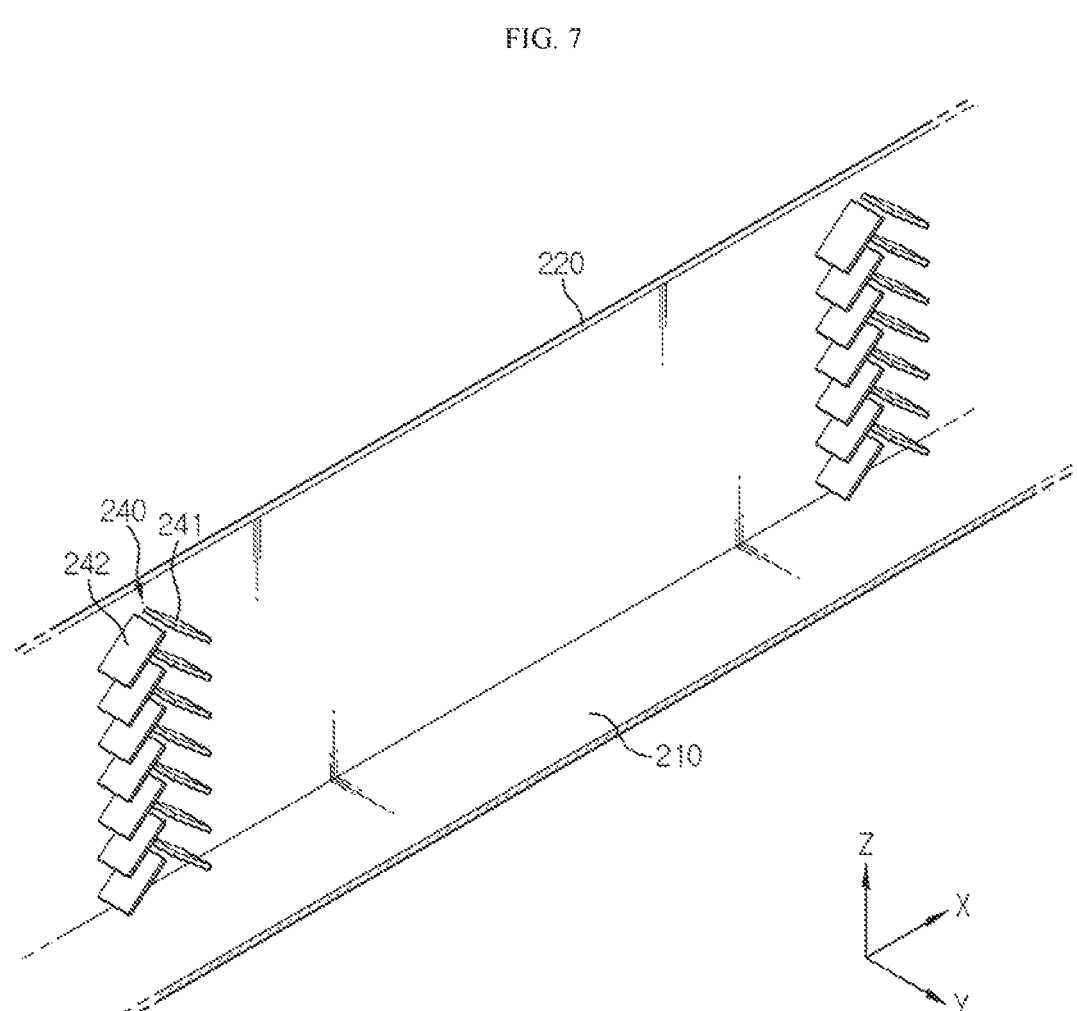
FIGS. 7 through 10 are views illustrating a shape of an inner surface of a side plate of a module housing according to the present disclosure.
Figure 8:
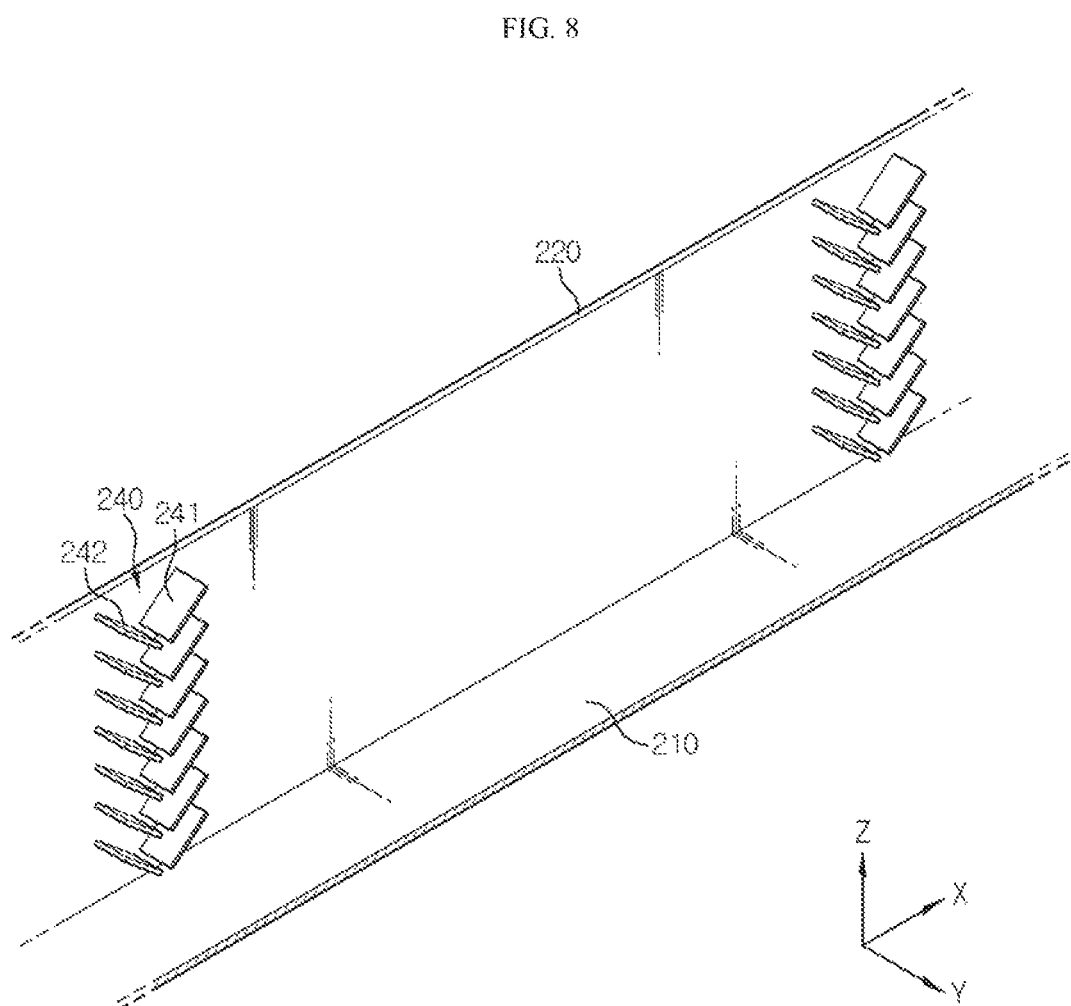
Figure 9:
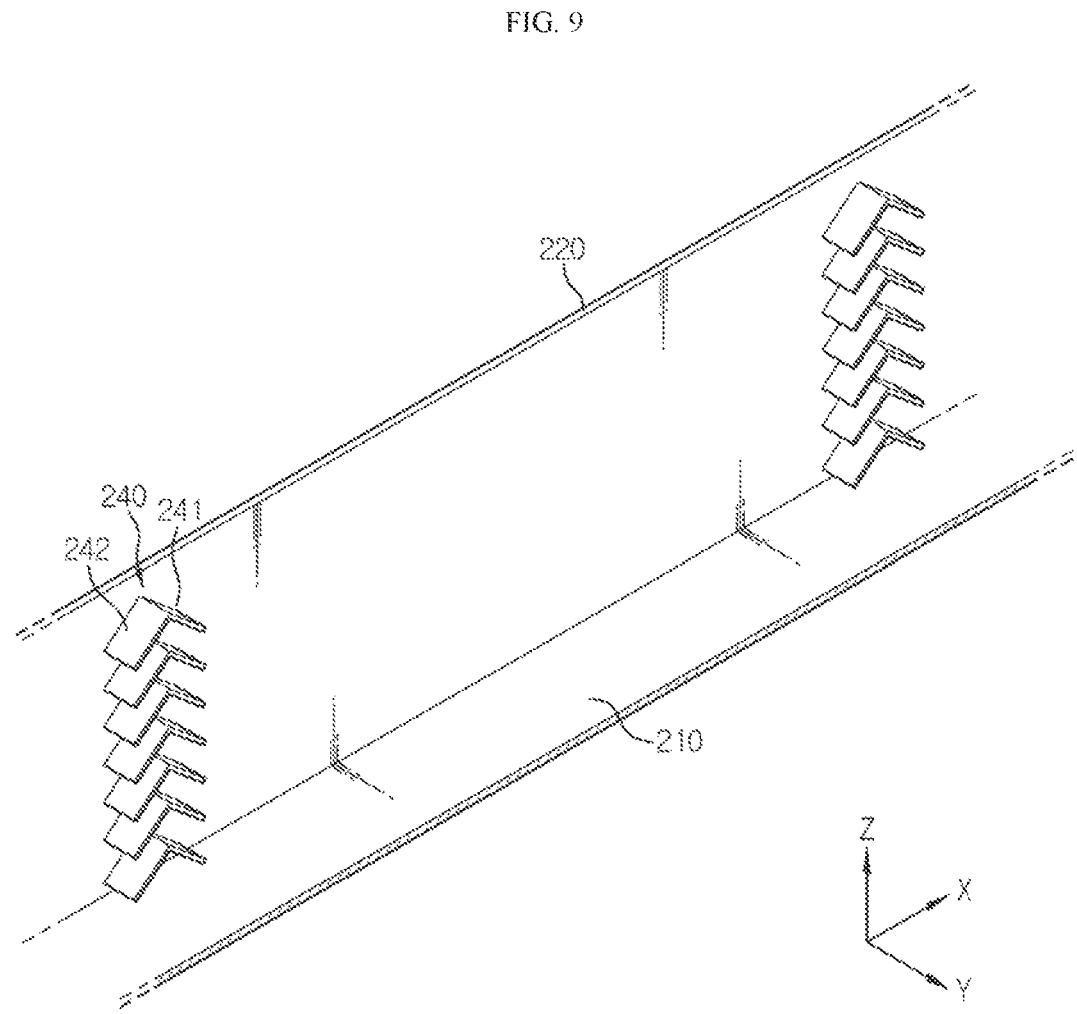
Figure 10:
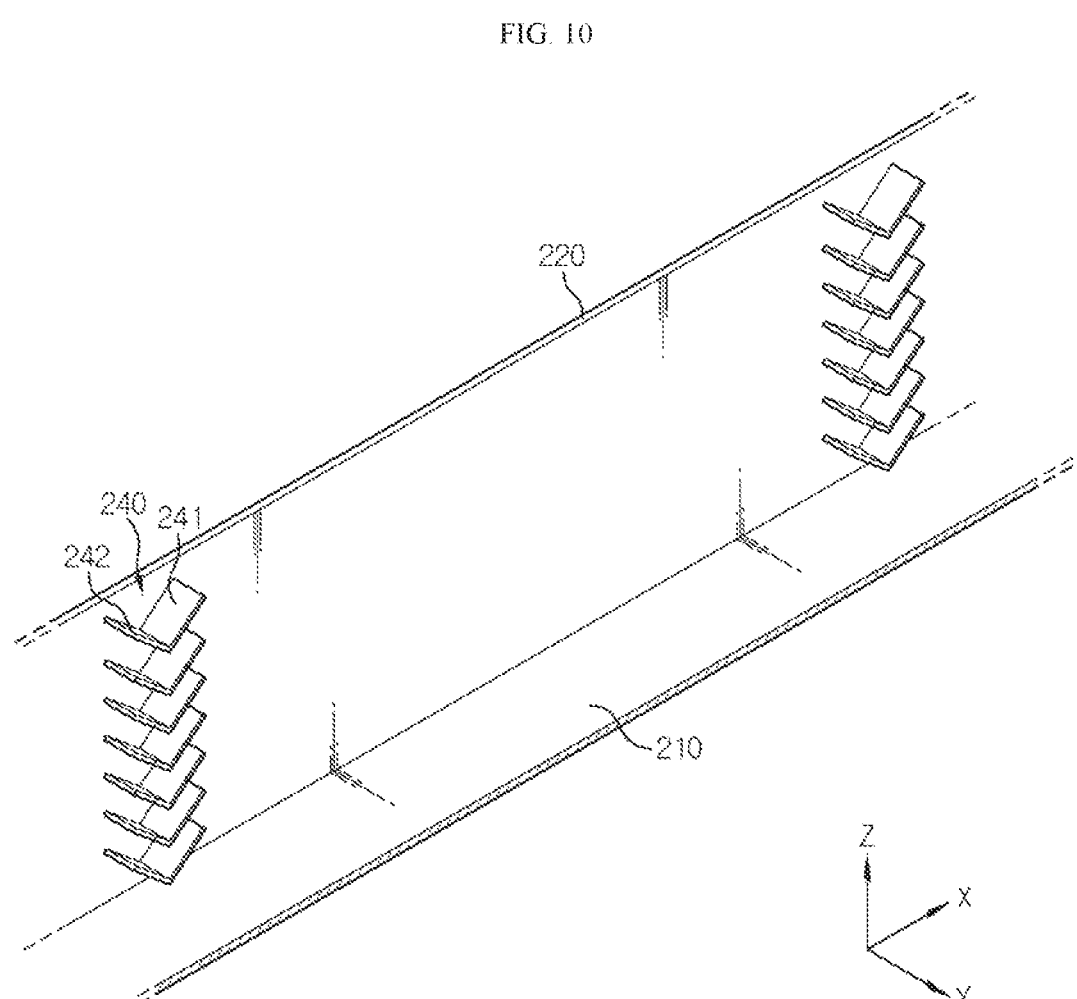

Referring to FIGS. 1 through 3, a battery module according to an embodiment of the present disclosure includes a cell stack in which a plurality of battery cells 100 are stacked in a vertical direction (direction parallel to a Z-axis), a module housing 200 in which the cell stack is accommodated, and a bus bar frame assembly 300 covering an opening portion formed on a side of the module housing 200 in a longitudinal direction (direction parallel to an X-axis) of the module housing 200. The battery module may further include, in addition to the above elements, a fire-proof sheet assembly 400 located between the bus bar frame assembly 300 and the cell stack and coupled to the bus bar frame assembly 300.

The battery cell 100 may be a pouch-type battery cell. In this case, the battery cell 100 includes an electrode assembly (not shown), a pouch case 110 in which the electrode assembly is accommodated, and a pair of electrode leads 120 connected to the electrode assembly and drawn out of the pouch case 110. The pair of electrode leads 120 are drawn in opposite directions in a longitudinal direction (direction parallel to the X-axis) of the battery cell 100.

The module housing 200 includes a base plate 210 supporting the cell stack, a pair of side plates 220 covering both side portions of the cell stack in a width direction (direction parallel to a Y-axis) of the cell stack, and a plurality of spark delay portions 240 protruding from an inner surface of each of the side plates 220. The module housing 200 may be formed of a metal material to ensure rigidity and resistance to high temperature in an event situation.

Each of the pair of side plates 220 may include spark direction changing portions 200a formed by bending an end portion and the other end portion of the side plate 220 in a longitudinal direction of the side plate 220 toward the cell stack. The spark direction changing portion 200*a* may be provided as a separate member distinguished from a remaining portion of the side plate 220 other than the spark direction changing portion 200*a*, and may be coupled to the remaining portion of the side plate 220 by using bolting or welding. Alternatively, the spark direction changing portion 200*a* may be integrally formed with the remaining portion of the side plate 220 other than the spark direction changing portion 200*a*.

Opening portions formed on a side and the other side of the module housing 200 in the longitudinal direction of the module housing 200 are formed between a pair of spark direction changing portions 200*a* respectively provided on the pair of side plates 220. The electrode lead 120 of the battery cell 100 may be exposed to the outside of the module housing 200 through the opening portion formed between the pair of spark direction changing portions 200*a*.

Because the battery module according to an embodiment of the present disclosure includes the spark direction changing portion 200*a* as described above, a high-temperature spark discharged during venting of the battery cell 100 is prevented from being ejected to the outside of the module housing 200 in the longitudinal direction of the module housing 200. That is, a high-temperature spark ejected through both side portions of the battery cell 100 in a width direction (direction parallel to a Y-axis) of the battery cell 100 of the cell stack during venting of the battery cell 100 moves toward an end portion and/or the other end portion of the battery module in a longitudinal direction (direction parallel to the X-axis) of the battery module and then switches a moving direction toward the cell stack (see an arrow direction of FIG. 2). Accordingly, the spark direction changing portion 200*a* prevents a spark from being discharged to the outside of the battery module through the opening portions on both sides of the module housing 200 in the longitudinal direction (direction parallel to the X direction) of the module housing 200.

Referring to FIGS. 7 through 10 together with FIG. 2, a plurality of spark delay portions 240 protrude from an inner surface of the side plate 220. The spark delay portions 240 protrude to a height corresponding to a distance between the side plate 220 and the battery cell 100. The plurality of spark delay portions 240 are spaced apart from one another in a height direction (direction parallel to a Z-axis) of the side plate 220.

Venting gas may pass through a flow path formed between adjacent spark delay portions 240. Also, a spark containing active material and metal particles ejected along with the venting gas may also pass through the flow path between adjacent spark delay portions 240. However, the spark delay portions 240 act as an obstacle in the path of the spark, and minimizes leakage of the spark through the opening portions formed on both sides of the module housing 200 in the longitudinal direction (direction parallel to the X-axis) of the module housing 200.

The spark delay portions 240 may be formed of a resin material. When the spark delay portions 240 are formed of a resin material, the spark delay portions 240 are at least partially melted through continuous contact with high-temperature gas and sparks. Accordingly, when a gap between adjacent spark delay portions 240 is blocked, it is difficult for external air to be introduced between the cell stack and the side plate 220, and thus, the amount of oxygen supplied to venting gas and a spark present in the battery module is insufficient, thereby suppressing ignition.

The spark delay portions 240 include a first delay plate 241 and a second delay plate 242 that are inclined upward (see FIGS. 7 and 9) or inclined downward (see FIGS. 8 and 10) with respect to the base plate 210 in a direction facing each other. Also, end portions of the first delay plate 241 and the second delay plate 242 facing each other may be spaced apart from each other (see FIGS. 7 and 8) or may be connected to each other (see FIGS. 9 and 10). When the first delay plate 241 and the second delay plate 242 are spaced apart from each other, a spark may be distributed in a height direction (direction parallel to the Z-axis) of the battery module through a gap between the first delay plate 241 and the second delay plate 242, thereby further reducing the risk of ejection of the spark through the opening portion of the module housing 200.

As described above, when a spark ejected through both side portions of the battery cell 100 in the width direction (direction parallel to the Y-axis) of the battery cell 100 moves in the longitudinal direction (direction parallel to the X-axis) of the side plate 220, the spark delay portions 240 increase a path and obstruct the spark. Accordingly, the spark delay portions 240 may prevent the spark from being exposed through the opening portions formed on both sides of the module housing 200 in the longitudinal direction (direction parallel to the X-axis) of the module housing 200, along with the spark direction changing portion 200*a*.

In order to maximize the synergistic effect of the spark delay portions 240 and the spark direction changing portion 200*a*, the spark delay portions 240 may be formed on an end portion and the other end portion of a remaining portion of the side plate 220 other than the spark delay portions 240 in the longitudinal direction (direction parallel to the X-axis) of the remaining portion of the side plate 220 other than the spark delay portions 240. This is to allow the spark delay portions 240 and the spark direction changing portion 200*a* to be located adjacent to each other.

The battery module according to an embodiment of the present disclosure may include only the spark delay portions 240, without including the spark direction changing portion 200*a*.

Referring to FIGS. 1 through 5, the bus bar frame assembly 300 includes a bus bar frame 310 and at least one bus bar 320. A pair of bus bar frame assemblies 300 may be provided, and in this case, the pair of bus bar frame assemblies 300 respectively cover the opening portion formed on a side and the opening portion formed on the other side of the module housing 200 in the longitudinal direction (direction parallel to the X-axis) of the module housing 200.

The bus bar frame 310 covers the opening portion of the module housing 200 and includes a plurality of frame slits 310*b* through which the electrode lead 120 of the battery cell 100 passes. The bus bar frame 310 may further include at least one frame protrusion 310*a* for coupling with the fire-proof sheet assembly 400.

The bus bar frame 310 has a shape corresponding to an end portion and/or the other end portion of the module housing 200 in the longitudinal direction of the module housing 200 and is closely attached to the module housing 200. When the module housing 200 includes a fastening frame 230 as described above, the bus bar frame 310 is closely attached to the spark direction changing portion 200*a* and the fastening frame 230.

The bus bar 320 is located on an outer surface of the bus bar frame 310, and is coupled to the electrode lead 120 passing through the frame slit 310*b*, to electrically connect the plurality of battery cells 100. The bus bar 320 may include a bus bar slit 320*b* through which the electrode lead 120 passes. In this case, the bus bar slit 320*b* and the frame slit 310*b* may be formed at positions corresponding to each other.

Referring to FIGS. 1 through 6, the fire-proof sheet assembly 400 includes a fire-proof sheet 410 and a sheet cover 420. The same number of fire-proof sheet assemblies 400 as the bus bar frame assemblies 300 may be provided.

The fire-proof sheet 410 may be a sheet formed of a mica material capable of withstanding high-temperature venting gas and sparks, and even flames. The fire-proof sheet 410 includes a plurality of sheet slits 410*b* through which the electrode lead 120 passes.

Even when the bus bar frame 310 formed of a resin material is damaged due to high-temperature venting gas and sparks, the fire-proof sheet 410 may maintain its structure, and thus, positions of the plurality of electrode leads 120 respectively inserted into the plurality of sheet slits 410*b* may be maintained. Also, the fire-proof sheet 410 may allow high-temperature venting gas to be discharged to the outside through a gap between the sheet slit 410*b* and the electrode lead 120, and may minimize outward ejection of a high-temperature spark containing active material and aluminum particles. Also, even when the bus bar frame 310 formed of a resin material is damaged, the fire-proof sheet 410 may prevent oxygen from being easily introduced from the outside into the battery module.

Accordingly, the fire-proof sheet 410 may minimize the risk of a fire around the bus bar frame 310 even when an event occurs in the battery module, and even when a fire occurs around the bus bar frame 310, the fire-proof sheet 410 may delay the spread of the fire into the battery module. Also, the fire-proof sheet 410 may prevent an event from spreading due to a short circuit between the battery cells 100 caused by damage to the bus bar frame 310.

The sheet cover 420 completely surrounds the fire-proof sheet 410 so that the fire-proof sheet 410 is not exposed to the outside. This is because the fire-proof sheet 410 formed of a mica material has hygroscopicity, and thus, when the fire-proof sheet 410 formed of a mica material is exposed to external air of the sheet cover 420, the fire-proof sheet 410 may absorb moisture, thereby degrading insulation performance.

The sheet cover 420 may be a resin injection molding product, and in this case, the fire-proof sheet 410 may be located in the sheet cover 420 through insert injection molding. The sheet cover 420 includes a plurality of cover slits 420*b* through which the electrode lead 120 passes. The cover slit 420*b* has a shape whose width decreases toward the bus bar frame assembly 300.

This is to, when the sheet cover 420 formed of a resin injection molding product is melted by high-temperature venting gas and sparks, rapidly close the cover slit 420*b* and block the inflow of air from the outside of the battery module. As such, when the inflow of external air is rapidly blocked, the supply of oxygen into the battery module may be blocked, and thus a fire may be prevented from spreading into the battery module.

The cover slit 420*b*, the sheet slit 410*b*, and the frame slit 310*b* are formed at positions corresponding to one another.

When the bus bar frame 310 includes the frame protrusion 310*a*, the fire-proof sheet 410 and the sheet cover 420 respectively include at least one sheet hole 410*a* and cover hole 420*a* formed to have positions and shapes corresponding to the frame protrusion 310*a* for fastening to the bus bar frame 310.

Although the fire-proof sheet assembly 400 includes both the fire-proof sheet 410 and the sheet cover 420 surrounding the fire-proof sheet 410 in the drawings, the present disclosure is not limited thereto, and the fire-proof sheet assembly 400 may include only the fire-proof sheet 410 without including the sheet cover 420.

A battery pack according to an embodiment of the present disclosure includes the battery module according to an embodiment of the present disclosure. The battery pack may include a plurality of battery modules. An energy storage system (ESS) according to an embodiment of the present disclosure includes the battery pack according to an embodiment of the present disclosure. A vehicle according to an embodiment of the present disclosure includes the battery pack according to an embodiment of the present disclosure. The vehicle includes an electric vehicle.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery module comprising:
   a cell stack in which a plurality of battery cells are vertically stacked;
   a module housing comprising a base plate supporting the cell stack and a pair of side plates covering side portions of the cell stack;
   a bus bar frame assembly covering an opening portion formed on an end of the module housing in a longitudinal direction of the module housing; and
   a plurality of spark delay portions protruding from an inner surface of each of the pair of side plates and spaced apart from one another in a height direction of each side plate,
   wherein the plurality of spark delay portions are provided in a space between each side plate and the battery cell and are configured to act as an obstacle in a path of a spark ejected from the battery cell into the space to obstruct the path.

2. The battery module of claim 1, wherein each side plate of the pair of side plates comprises a spark direction changing portion formed by bending an end portion of each side plate in a longitudinal direction of each side plate toward the cell stack.

3. The battery module of claim 2, wherein the opening portion is formed between a pair of the spark direction changing portions respectively provided on the pair of side plates, and
   wherein electrode leads of the plurality of battery cells are exposed to outside of the module housing through the opening portion.

4. The battery module of claim 1, wherein the bus bar frame assembly comprises:
   a bus bar frame covering the opening portion, and comprising a plurality of frame slits through which electrode leads of the plurality of battery cells pass; and
   at least one bus bar located on an outer surface of the bus bar frame and coupled to the electrode leads passing through the plurality of frame slits.

5. The battery module of claim 1, wherein the module housing is formed of a metal material, and
   wherein the plurality of spark delay portions are formed of a resin material.

6. The battery module of claim 1, wherein the plurality of spark delay portions are aligned in the height direction of each side plate.

7. The battery module of claim 6, wherein each of the plurality of spark delay portions is V-shaped.

8. The battery module of claim 1, wherein the plurality of spark delay portions include a first set of spark delay portions and a second set of spark delay portions spaced from the first set in a longitudinal direction of each side plate.

9. A battery module comprising:

a cell stack in which a plurality of battery cells are vertically stacked;

a module housing comprising a base plate supporting the cell stack and a pair of side plates covering side portions of the cell stack;

a bus bar frame assembly covering an opening portion formed on an end of the module housing in a longitudinal direction of the module housing;

a plurality of spark delay portions protruding from an inner surface of each of the pair of side plates and spaced apart from one another in a height direction of each side plate; and a fire-proof sheet assembly located between the bus bar frame assembly and the cell stack, and coupled to the bus bar frame assembly.

10. The battery module of claim 9, wherein the fire-proof sheet assembly comprises a fire-proof sheet comprising a plurality of sheet slits through which electrode leads of the plurality of battery cells pass.

11. The battery module of claim 10, wherein the fire-proof sheet assembly further comprises a sheet cover comprising a plurality of cover slits through which the electrode leads of the plurality of battery cells pass, the sheet cover covering the fire-proof sheet.

12. The battery module of claim 11, wherein the sheet cover completely surrounds the fire-proof sheet so that the fire-proof sheet is not exposed to external air.

13. The battery module of claim 11, wherein a width of each of the plurality of cover slits decreases toward the bus bar frame assembly.

14. The battery module of claim 10, wherein the fire-proof sheet is a mica sheet.

15. A battery module comprising:

a cell stack in which a plurality of battery cells are vertically stacked;

a module housing comprising a base plate supporting the cell stack and a pair of side plates covering side portions of the cell stack;

a bus bar frame assembly covering an opening portion formed on an end of the module housing in a longitudinal direction of the module housing; and a plurality of spark delay portions protruding from an inner surface of each of the pair of side plates and spaced apart from one another in a height direction of each side plate, wherein the plurality of spark delay portions comprise a first delay plate and a second delay plate inclined upward or inclined downward with respect to the base plate.

16. The battery module of claim 15, wherein the first delay plate and the second delay plate are spaced apart from each other.

17. A battery pack comprising the battery module according to claim 1.

18. An energy storage system (ESS) comprising the battery pack according to claim 17.

19. A vehicle comprising the battery pack according to claim 17.

* * * * *